(12) United States Patent
Hasegawa et al.

(10) Patent No.: US 10,396,326 B2
(45) Date of Patent: Aug. 27, 2019

(54) BATTERY BLOCK

(71) Applicant: SANYO Electric Co., Ltd., Osaka (JP)

(72) Inventors: Takashi Hasegawa, Osaka (JP); Masatoshi Nagayama, Osaka (JP); Daisuke Kishii, Osaka (JP); Akira Takano, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 723 days.

(21) Appl. No.: 14/766,780

(22) PCT Filed: Feb. 10, 2014

(86) PCT No.: PCT/JP2014/000689
§ 371 (c)(1),
(2) Date: Aug. 10, 2015

(87) PCT Pub. No.: WO2014/125806
PCT Pub. Date: Aug. 21, 2014

(65) Prior Publication Data
US 2015/0380700 A1     Dec. 31, 2015

(30) Foreign Application Priority Data

Feb. 14, 2013   (JP) .................................. 2013-027092

(51) Int. Cl.
*H01M 2/12*        (2006.01)
*H01M 2/34*        (2006.01)
(Continued)

(52) U.S. Cl.
CPC ....... *H01M 2/1223* (2013.01); *H01M 2/1077* (2013.01); *H01M 2/1235* (2013.01);
(Continued)

(58) Field of Classification Search
CPC ............ H01M 2/1235; H01M 2/1241; H01M 2/1223; H01M 2/1229; H01M 2/345; H01M 2/348; H01M 2200/103; H01M 2200/20

See application file for complete search history.

(56) References Cited

U.S. PATENT DOCUMENTS

2011/0171505 A1    7/2011   Kishll et al.
2011/0177365 A1*   7/2011   Yasui .................... H01M 2/105
                                                        429/61

(Continued)

FOREIGN PATENT DOCUMENTS

CN        102203981        9/2011
CN        202259560 U      5/2012
(Continued)

OTHER PUBLICATIONS

English Translation of Chinese Search Report dated Oct. 31, 2016 for the related Chinese Patent Application No. 201480008671.0.
(Continued)

*Primary Examiner* — Stephan J Essex
(74) *Attorney, Agent, or Firm* — McDermott Will & Emery LLP (57) ABSTRACT

Battery block includes the following elements: a plurality of batteries each of which includes safety valve; positive electrode-side current collecting part for collecting current by connecting the positive electrode sides of batteries; and negative electrode-side current collecting part for collecting current by connecting the negative electrode sides of the batteries. In positive electrode-side current collecting part and negative electrode-side current collecting part, the part that includes safety valves is set to one side current collecting part. On the other side current collecting part opposite
(Continued)

the one side current collecting part, fuse that fuses at a predetermined temperature is disposed on each of batteries.

4 Claims, 4 Drawing Sheets

(51) Int. Cl.
  *H01M 2/10* (2006.01)
  *H01M 10/0525* (2010.01)

(52) U.S. Cl.
  CPC ......... *H01M 2/1241* (2013.01); *H01M 2/348* (2013.01); *H01M 10/0525* (2013.01); *H01M 2200/103* (2013.01); *H01M 2200/20* (2013.01)

(56) References Cited

U.S. PATENT DOCUMENTS

| | | |
|---|---|---|
| 2011/0212348 A1 | 9/2011 | Yasui et al. |
| 2012/0328914 A1* | 12/2012 | Wu ................... H01M 2/202 429/61 |
| 2013/0095356 A1* | 4/2013 | Shimizu ............. H01M 2/1077 429/88 |
| 2014/0154530 A1* | 6/2014 | Fujiwara ............. H01M 2/1077 429/7 |

FOREIGN PATENT DOCUMENTS

| | | | |
|---|---|---|---|
| JP | 10-003901 | 1/1998 | |
| JP | 10-214613 | 8/1998 | |
| JP | 2012-015121 | 1/2012 | |
| JP | WO 2012017586 A1 * | 2/2012 | .......... H01M 2/1077 |
| WO | 2011/007535 | 1/2011 | |
| WO | 2011/007547 | 1/2011 | |

OTHER PUBLICATIONS

International Search Report of PCT application No. PCT/JP2014/000689 dated Apr. 15, 2014.

* cited by examiner

BATTERY BLOCK

This application is a U.S. national stage application of the PCT international application No. PCT/JP2014/000689.

TECHNICAL FIELD

The present invention relates to a battery block configured by connecting a plurality of batteries each other.

BACKGROUND ART

A battery using an electrochemical reaction includes a safety valve in case of high pressure of the inside gas, and a fuse in case of high temperature.

Patent Literature 1 describes examples of a power supply device that has a plurality of batteries each having a safety valve in a case. In one example, each of the batteries has a safety valve at the bottom end, a battery chamber is provided on the top side in the case, and a duct chamber is provided on the bottom side in the case. In the other example, each of the batteries has a safety valve at the top end, a battery chamber is provided on the bottom side in the case, and a duct chamber is provided on the top side in the case.

CITATION LIST

Patent Literature

PTL 1: Japanese Patent Unexamined Publication No. 2012-15121

SUMMARY OF THE INVENTION

Technical Problem

In a battery block, safety valves for releasing exhaust gas and fuses need to be disposed properly.

Solution to Problem

A battery block of the present invention includes the following elements: a plurality of batteries each of which includes a safety valve and disposed in an arrangement; a positive electrode-side current collecting part for collecting current by connecting positive electrode sides of the plurality of batteries; and a negative electrode-side current collecting part for collecting current by connecting negative electrode sides of the plurality of batteries. In the positive electrode-side current collecting part and the negative electrode-side current collecting part that are connected to the plurality of batteries, one of the parts including the safety valves is set to one side current collecting part. On the other side current collecting part opposite the one side current collecting part in the arrangement, a fuse is disposed on each of the batteries.

Advantageous Effect of Invention

In a battery block in accordance with the present invention, safety valves and fuses are disposed on different current collecting parts. When the safety valves and the fuses are disposed on the same current collecting part, the emission from the safety valves after fuses are fused can reconnect the fuses. However, with the above configuration, the function of the fuses is not affected by the emission from the safety valves. Thus, the safety valves and the fuses can be disposed properly.

DESCRIPTION OF EMBODIMENT

Hereinafter, a detailed description of the exemplary embodiment of the present invention is provided with reference to the accompanying drawings. The material, dimension, shape, the number of batteries, or the like described below is only an example for description, and may be changed appropriately for the specifications of the battery block. In the following description, the corresponding elements in all the drawings have the same reference marks and the descriptions of those elements are omitted.

Figure 1:
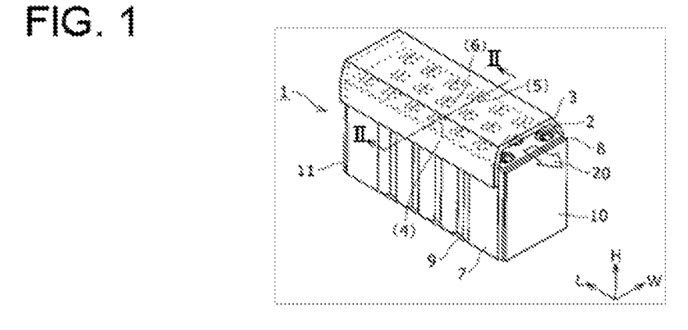
FIG. 1 is a perspective view of a battery block when a duct chamber is provided in accordance with an example of an exemplary embodiment of the present invention.
Figure 2:
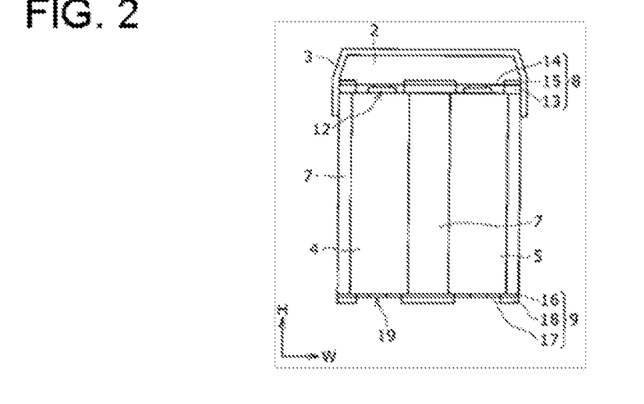
FIG. 2 is a sectional view taken along II-II line of FIG. 1.

FIG. 1 is a perspective view of battery block 1. Battery block 1 is configured so that a plurality of batteries is connected in parallel to provide a predetermined capacity. FIG. 1 shows duct cover 3, which is not an element of battery block 1. The duct cover covers battery block 1 and forms duct chamber 2. FIG. 2 is a sectional view taken along II-II line of FIG. 1.

In battery block 1, a plurality of batteries 4, 5 is arranged in a predetermined positional relation so that each of the positive electrode sides is on one side and each of the negative electrode sides is on the other side. The plurality of batteries are held in case 7, positive electrode-side current collecting part 8 is disposed on the positive electrode sides, and negative electrode-side current collecting part 9 is disposed on the negative electrode sides. Positive electrode-side current collecting part 8 and negative electrode-side current collecting part 9 are fastened via holders 10, 11 by a suitable fastening member. In battery block 1, 20 batteries are connected in parallel, and batteries 4, 5, which are two of the 20 batteries, are shown in FIG. 2. Hereinafter, batteries 4, 5 are described as typical ones of the 20 batteries.

Each of batteries 4, 5 is a rechargeable/dischargeable secondary battery. As the secondary battery, a lithium ion battery is used. Other examples include a nickel-metal hydride battery and an alkali battery. Each of batteries 4, 5 has a cylindrical external shape. One of both ends of the cylindrical shape is used as a positive electrode terminal, and the other end is used as a negative electrode terminal. An example of each of batteries 4, 5 is a lithium ion battery in which the diameter is 18 mm, the height is 65 mm, the voltage between terminals is 3.6 V, and the capacity is 2.5 Ah. This is an example for description, and the battery may have a different dimensions and characteristic values. The shape of each of batteries 4, 5 is not limited to a cylindrical one and may have another external shape.

Each of batteries 4, 5 has safety valve 12. Safety valves 12 function to release exhaust gas from the inside to the outside of the corresponding batteries when the pressure of the gas generated by the electrochemical reaction performed inside batteries 4, 5 exceeds a predetermined threshold pressure. Safety valves 12 are disposed on the positive electrode sides of corresponding batteries 4, 5. Safety valve 12 is provided to each of the 20 batteries. Safety valve 12 will be detailed later with reference to FIG. 3. Batteries 4, 5 may have, on the negative electrode sides, a function of releasing exhaust gas from the inside to the outside of the corresponding batteries when the pressure of the gas generated by the electrochemical reaction performed inside batteries 4, 5 exceeds a predetermined threshold pressure.

Case 7 is a holding container for arranging and holding batteries 4, 5 in a predetermined positional relation. Case 7 is a frame body that has a height equal to that of each of batteries 4, 5, and has 20 battery holding parts with an opening at both ends in the height direction. Each of batteries 4, 5 is disposed and held in one of the battery holding parts. The battery holding parts are arranged in a hound's-tooth pattern (a staggered (zigzag) pattern), which minimizes the space between adjacent batteries. Examples of such case 7 include a case made of aluminum material, for example, into a predetermined shape by extrusion molding, die casting, or the like.

FIG. 1 shows three axial directions orthogonal to each other, i.e. the H direction, L direction, and W direction. The H direction is a longitudinal direction of each of batteries 4, 5. Each of the L direction and the W direction shows a two-dimensional direction in which batteries 4, 5 are arranged. Here, the direction having a large dimension is the L direction and that having a small dimension is the W direction. This expression is also used in the other drawings. FIG. 1 shows 20 electrode parts corresponding to the 20 batteries 4, 5 in positive electrode-side current collecting part 8. Three battery lines are disposed in the W direction. The battery lines include seven, six, and seven batteries along the L direction.

When batteries 4, 5 are held in the battery holding parts in case 7, the positive electrode sides of batteries 4, 5 are on one side and the negative electrode sides thereof are on the other side. In FIG. 1, the one side is the upper side of the page along the H direction, which is toward duct chamber 2. The other side is the lower side of the page along the H direction, which is opposite the direction toward duct chamber 2.

Positive electrode-side current collecting part 8 is a connecting member disposed to block the openings on one side of case 7 and electrically connecting the positive electrode sides of batteries 4, 5 disposed in an arrangement. As shown in FIG. 2, positive electrode-side current collecting part 8 is composed of positive electrode-side insulating plate 13, positive electrode current collector 14, and positive electrode plate 15.

Positive electrode-side insulating plate 13 is a plate material disposed between case 7 and positive electrode current collector 14 and positive electrode plate 15, and electrically insulating therebetween. Positive electrode-side insulating plate 13 has 20 openings from which the corresponding positive electrodes of batteries 4, 5 project. Examples of such positive electrode-side insulating plate 13 include a plate that is made of a plastic molding or a plastic sheet having a predetermined heat resistance and electrically insulating property and is formed into a predetermine shape.

Positive electrode current collector 14 is a thin plate having a positional relation so that 20 electrode contact parts are in elastic contact with the corresponding positive electrode-side electrodes of batteries 4, 5. Examples of such positive electrode current collector 14 include a metal thin plate having electrical conductivity in which electrode contact parts are formed into a predetermined shape by etching or pressing.

Positive electrode plate 15 is an electrode plate that is electrically connected to positive electrode current collector 14 and interconnects the 20 electrode contact parts to form one positive electrode-side output terminal. Positive electrode plate 15 has 20 openings so that the corresponding electrode contact parts of positive current collector 14 can be elastically deformed. Examples of such positive electrode plate 15 include a metal thin plate having electrical conductivity and a suitable thickness and strength so that the electrode contact parts are formed into a predetermined shape by etching or pressing.

Negative electrode-side current collecting part 9 is a connecting member disposed in the opening of case 7 on the other side of case 7 and electrically connecting the negative electrode sides of batteries 4, 5 disposed in an arrangement. As shown in FIG. 2, negative electrode-side current collecting part 9 is composed of negative electrode-side insulating plate 16, negative electrode current collector 17, and negative electrode plate 18.

Negative electrode-side insulating plate 16 is made of plate material disposed between case 7 and positive electrode current collector 17 and negative electrode plate 18, and electrically insulating therebetween. Negative electrode-side insulating plate 16 has 20 openings from which the corresponding negative electrodes of batteries 4, 5 are exposed. Examples of such negative electrode-side insulating plate 16 includes a plate that is made of a plastic molding or a plastic sheet having a predetermined heat resistance and electrically insulating property and is formed into a predetermine shape.

Negative electrode current collector 17 is a thin plate having a positional relation so that the 20 electrode contact parts are in elastic contact with the corresponding negative electrode-side electrodes of batteries 4, 5. Examples of such negative electrode current collector 17 include a metal thin plate having electrical conductivity in which electrode contact parts are formed into a predetermined shape by etching or pressing.

Fuses 19 are provided to negative electrode current collector 17. Fuses 19 are temperature safety devices that interrupt electrical connection between the electrode contact parts and negative electrode plate 18 by fusing when the temperatures of corresponding batteries 4, 5 exceed a predetermined threshold temperature. Fuse 19 is provided to each of the 20 electrode contact parts. The configuration of fuse 19, for example, will be detailed later with reference to FIG. 4. By disposing fuse 19 in each of batteries 4, 5, battery block 1 can maintain electrical connection even when part of fuses in the 20 batteries 4, 5 connected in parallel is fused.

By disposing fuses 19 in the corresponding electrode contact parts in the vicinity of batteries 4, 5, wiring can be simplified and the size of battery block 1 can be reduced.

Negative electrode plate 18 is an electrode plate that is electrically connected to negative electrode current collector 17 and interconnects the 20 electrode contact parts via the corresponding fuses 19 so as to form one negative electrode-side output terminal. Negative electrode plate 18 has 20 openings so that the corresponding electrode contact parts of negative-electrode current collector 17 can be elastically deformed. Examples of negative electrode plate 18 include a metal thin plate having electrical conductivity and a suitable thickness and strength so that the electrode contact parts are formed into a predetermined shape by etching or pressing.

Holders 10, 11 are members used to fasten positive electrode-side current collecting part 8 disposed on one side of case 7 and negative electrode-side current collecting part 9 disposed on the other side, using a fastening member not shown. Thus, holders integrate positive electrode-side current collecting part 8 and negative electrode-side current collecting part 9. Holders 10, 11 are disposed along the facing sides of the external shape of case 7. With reference to FIG. 1, holder 10 is disposed at one end and holder 11 is disposed at the other end in the L direction of case 7. Examples of such holders 10, 11 include an insulating plate formed into a predetermined shape. Holders 10, 11 do not need to be formed separately. For instance, the side parts covering the side faces of case 7 may be integrally formed with the top part covering the positive electrode sides of batteries 4, 5. The side parts covering the side faces of case 7 may be integrally formed with the bottom part covering the negative electrode sides of batteries 4, 5. As the method for fastening positive electrode-side current collecting part 8 and negative electrode-side current collecting part 9 to holders 10, 11, the following example may be used. In each of holders 10, 11, a female screw is provided at the end of the positive electrode side and the end of the negative electrode side along the H direction. Bolt insertion holes corresponding to the female screws are provided through each of positive electrode-side current collecting part 8 and negative electrode-side current collecting part 9. Then, the female screws at the ends of the positive electrode sides of holders 10, 11 are aligned with the bolt insertion hole through positive electrode-side current collecting part 8. Next, a bolt is threaded through the bolt insertion hole through positive electrode-side current collecting part 8 and screwed into the female screws at the ends of the positive electrode sides of holders 10, 11. Similarly, the female screws at the ends on the negative sides of holders 10, 11 are aligned with the bolt insertion hole through negative electrode-side current collecting part 9. Next, a bolt is threaded through the bolt insertion hole through negative electrode-side current collecting part 9 and screwed into the female screws at the ends of the negative electrode sides of holders 10, 11. Thus, case 7, positive electrode-side current collecting part 8, negative electrode-side current collecting part 9, and holders 10, 11 are integrated.

Duct cover 3 is not an element of battery block 1. The duct cover is a component that covers the positive electrode-side end of battery block 1 and is hermetically joined to the side faces of case 7 extending in the L direction so as to form duct chamber 2 capable of causing gas to flow to the side of the positive electrode-side end of battery block 1. Batteries 4, 5 forming battery block 1 have safety valves 12 on the positive electrode sides; thus, using duct chamber 2, the exhaust gas from safety valves 12 can be released through duct camber 2 to the outside from a predetermined exhaust port without leaking out from other parts. FIG. 1 shows exhaust gas flow 20 using the arrow outline with a blank inside. Examples of such duct cover 3 include a cover made of material having a predetermined heat resistance and strength and formed into a predetermined shape.

Figure 3:
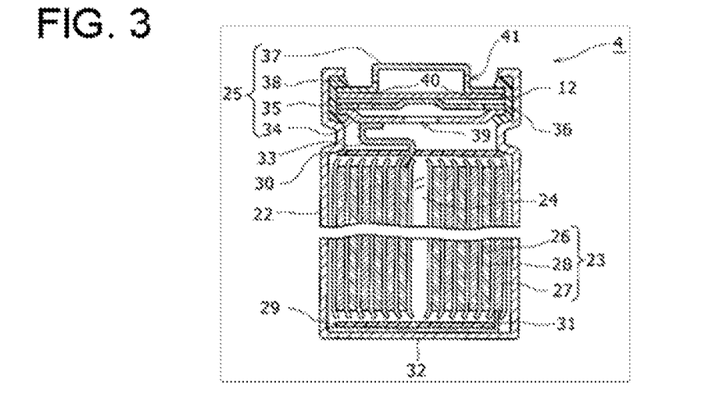
FIG. 3 is a sectional view of a battery that forms the battery block in accordance with the example of the exemplary embodiment.

Next, a description is provided for the configuration of battery 4 and safety valve 12 with reference to FIG. 3. FIG. 3 is a sectional view of battery 4. Battery 4 is composed of metallic outer case 22 having an open top, electrode group 23 held in the outer case, electrolyte 24, and cover 25 for blocking the open top. Safety valve 12 is disposed in cover 25.

Electrode group 23 is formed by winding positive electrode body 26 and negative electrode body 27 with separator 28 interposed therebetween. Positive electrode body 26 includes lithium-containing complex oxides. For example, negative electrode body 27 includes graphite that reversibly stores and releases lithium ions. Examples of electrolyte 24 include a non-aqueous electrolytic solution in which a solute is dissolved in an organic solvent, and a polymer electrolyte layer containing such a non-aqueous electrolytic solution and non-fluidized by a polymer. On the bottom side of electrode group 23, insulating plate 29 is disposed. On the top side of the electrode group, insulating plate 30 is disposed.

Negative electrode lead 31 is led from negative electrode body 27 of electrode group 23, drawn to the portion lower than insulating plate 29, and welded to outer case 22. Thus, metallic outer case 22 becomes negative electrode 32.

Positive electrode lead 33 is led from positive electrode body 26 of electrode group 23, drawn to the side upper than insulating plate 30, and welded to lower sealing element 34.

Cover 25 is formed of a laminate of lower sealing element 34, upper sealing element 35, safety valve 12 and positive electrode 37, and is integrated into outer case 22 using fixing members 36, 38.

Here, lower sealing element 34, upper sealing element 35, and positive electrode 37 are all conductors, and have first opening 39, second opening 40, and third opening 41, respectively. Safety valve 12 is a metal sheet and has the following function. When the pressure of gas generated by the electrochemical reaction performed inside battery 4 exceeds a predetermined threshold pressure, the safety valve breaks and releases the exhaust gas from the inside to the outside of battery 4. That is, when gas is generated in a portion of electrode group 23 and electrolyte 24, the gas leaks upward from the space between insulating plate 30 and outer case 22. Thus, the gas goes through first opening 39 and second opening 40, and the gas pressure is applied to safety valve 12. When this gas pressure exceeds the threshold pressure, safety valve 12 as a metal sheet breaks, and the gas is released through third opening 41 to the outside of battery 4.

Figure 4:
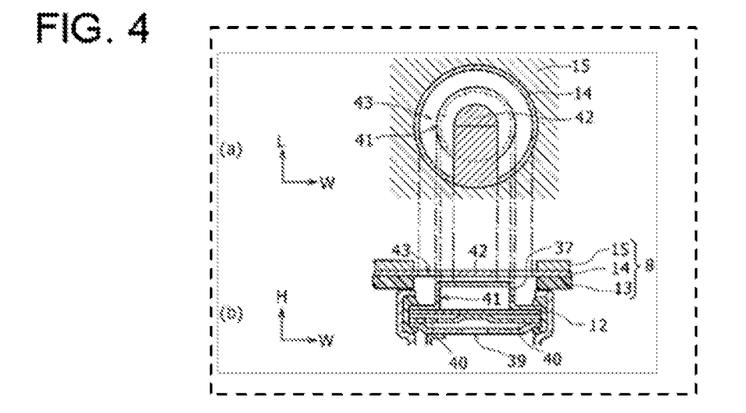
FIG. 4 is an enlarged view of part of a safety valve in the battery block in accordance with the example of the exemplary embodiment.

FIG. 4 is a diagram showing the positive electrode side of battery 4. FIG. 4 (a) is a sectional view, and FIG. 4 (b) is a top view of FIG. 4 (a).

Suppose the gas pressure when safety valve 12 breaks is threshold pressure $P_0$. When internal pressure P of battery 4 is equal to or lower than threshold pressure $P_0$, safety valve 12 does not break and is kept as the metal sheet, and the gas remains inside battery 4. When internal pressure P of battery 4 exceeds threshold pressure $P_0$, safety valve 12 breaks. Thereby, the high-pressure gas inside battery 4 flows through third opening 41 to the outside of battery 4. In this case, third opening 41 works as the exhaust gas jet outlet.

Use of safety valve 12 in this manner can prevent an abnormal state where the inside of battery 4 is maintained above threshold pressure $P_0$.

As shown in FIG. 4 (a), (b), electrode contact part 42 in positive electrode current collector 14 has a flat spring shape with one end thereof as a fixed end, and fourth opening 43 is provided in an annular shape around the electrode contact part. When the flat spring shape of electrode contact part 42 is properly bent and shaped, the electrode contact part makes contact with the protruding part of positive electrode 37 of battery 4. Thus, positive electrode 37 of battery 4 makes electrical contact with positive electrode-side current collecting part 8. Here, fourth opening 43 is formed so that electrode contact part 42 has a flat spring shape with one end thereof as a fixed end and also has the following function. When internal pressure P of battery 4 exceeds threshold pressure $P_0$, fourth opening 43 releases the gas flowing through first opening 39, second opening 40, third opening 41, and fourth opening 43 to the outside of battery 4, as the exhaust gas, toward duct chamber 2. Thus, when the pressure of gas generated by the electrochemical reaction performed inside battery 4 exceeds the predetermined threshold pressure $P_0$, safety valve 12 releases the gas, as the exhaust gas, from the inside to the outside of battery 4.

In the above description, safety valve 12 is made of a metal sheet. However, another configuration can be used as a safety valve 12. This configuration includes a valve body for blocking second opening 40 and a safety valve spring for pressing the valve body with a suitable pressing force. In this case, the pressing force of the safety valve spring is set so as to correspond to threshold pressure $P_0$. Any configuration capable of specifying threshold pressure $P_0$ may be used as safety valve 12.

Figure 5:
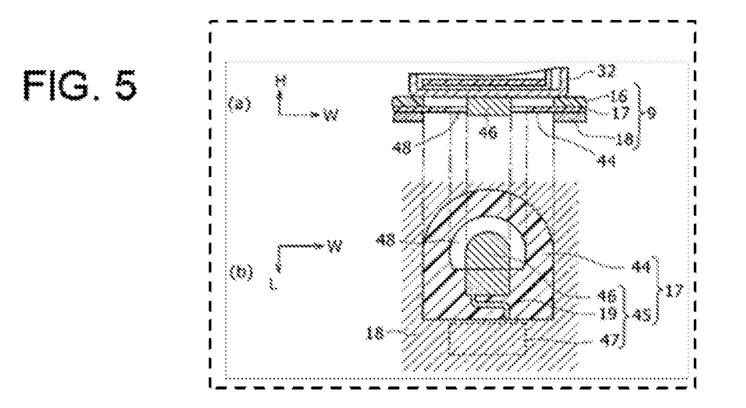
FIG. 5 is an enlarged view of part of a fuse in the battery block in accordance with the example of the exemplary embodiment.

Next, a description is provided for the configuration of negative electrode current collector 17 having fuse 19 with reference to FIG. 5. FIG. 5 (a) is a sectional view of the negative electrode side of battery 4, showing negative electrode 32. FIG. 5 (b) is a bottom view of FIG. 5 (a), particularly showing a plan view of negative electrode current collector 17.

As shown in FIG. 5 (b), negative electrode current collector 17 has a predetermined conductor pattern 45 formed on flexible thin insulating film 44. In flexible pattern 45, electrode contact part 46 on the negative electrode side, fuse 19, and current collector plate body connecting section 47 are connected. Examples of such negative electrode current collector 17 include flexible thin insulating film 44 made of polyimide on which a copper wiring pattern, gold wiring pattern, or the like having a predetermined thickness is formed into a predetermined pattern, as conductor pattern 45.

Thin insulating film 44 has electrode contact part 46 provided into a flat spring shape with one end thereof as a fixed end and fifth opening 48 provided in a U shape around the electrode contact part. When the flat spring shape of electrode contact part 46 is properly bent and shaped, the electrode contact part makes contact with negative electrode 32 of battery 4.

Fuse 19 is a current breaking device, but is made of a material that can be reconnected after fusing. Fuse 19 fuses when the current of battery 4 becomes an overcurrent and the temperature of fuse 19 exceeds predetermined threshold temperature $T_0$. To detect an overcurrent, fuse 19 is set in a long thin wiring pattern so as to have a predetermined high resistance value. Fuse 19 is connected to electrode contact part 46 at one end and to current collector plate body connecting section 47 at the other end. Current collector plate body connecting section 47 is electrically connected to negative electrode plate 18, which is a current collector plate body. In other words, fuse 19 is provided between electrode contact part 46 and negative electrode plate 18, and fuses and interrupts electrical connection between battery 4 and negative electrode plate 18 when the temperature of fuse 19 exceeds predetermined threshold temperature $T_0$.

In the above description, a resistor of long thin wiring is used as fuse 19, and threshold temperature $T_0$ is specified corresponding to the threshold current at which the resistor fuses. Instead, fuse 19 may be made of a material whose threshold temperature $T_0$ can be specified by the melting point of the resistor. In this case, fuse 19 made of a material having a predetermined threshold melting point is connected between electrode contact part 46 and current collector plate body connecting section 47. Any other material that can specify threshold temperature $T_0$ can be used as fuse 19.

In this manner, safety valves 12 are provided on the positive sides of batteries 4, 5, and fuses 19 are provided on the negative sides of the batteries. Thus, the function of the fuses is not affected by the emission from the safety valves. If both safety valves 12 and fuses 19 are provided on the positive sides or negative sides of the batteries, the emission from safety valves 12 can reconnect the fuses 19 after the fuses are fused. For instance, when the emission from the exhaust gas is a conductive substance, fuses 19 once fused can be reconnected or adjacent fuses 19 that are not fused can be short-circuited by the conductive substance.

The above advantage is exerted when safety valves 12 are provided on the negative sides of batteries 4, 5 and fuses 19 are provided on the positive sides of the batteries. In short, one of positive electrode-side current collecting part 8 and the negative electrode-side current collecting part connected to batteries 4, 5, the current collecting part provided with safety valves 12 is set to one side of the current collecting parts, fuses 19 that fuse at a predetermined temperature are disposed at the other side of the current collecting parts opposite the one side.

In the above description, the exhaust gas from safety valves 12 goes through fourth openings 43 of positive electrode collector 14 and jets into duct chamber 2 formed by duct cover 3. The jetting direction is not the same as exhaust gas flow 20 shown by the arrow outline with a blank inside in FIG. 1, and is perpendicular to exhaust gas flow 20. When the jetting direction can be guided through fourth opening 43 to exhaust gas flow 20 in duct chamber 2, the exhaust gas can be more rapidly released to the outside.

Figure 6:
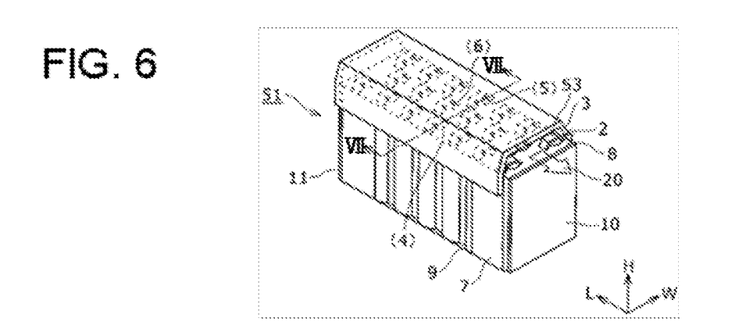
FIG. 6 is a diagram showing an example having flow guide parts for guiding flow of exhaust gas from the safety valves in FIG. 1.
Figure 7:
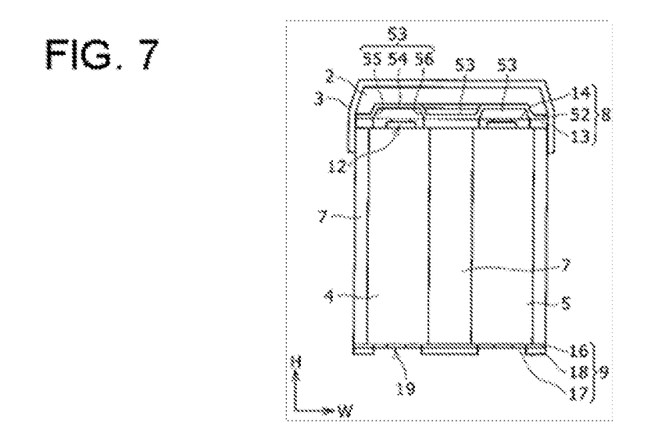
FIG. 7 is a sectional view taken along VII-VII line in FIG. 6.
Figure 8:
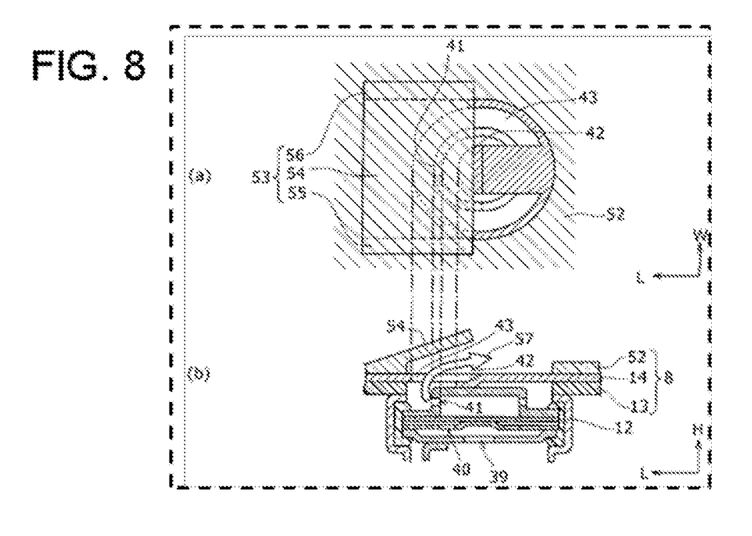
FIG. 8 is an enlarged view of part of the flow guide part of FIG. 1.

Each of FIG. 6, FIG. 7, and FIG. 8 is a diagram showing battery block 51 that includes flow guide parts for guiding the exhaust gas flow to a predetermined exhaust gas direction. FIG. 6 corresponds to FIG. 1, FIG. 7 corresponds to FIG. 2, and FIGS. 8 (a) and (b) correspond to FIGS. 4 (a) and (b), respectively. However, in FIGS. 4 (a) and (b), the horizontal direction of the page is the W direction. In FIGS. 8 (a) and (b), the horizontal direction of the page is the L direction, namely, a direction parallel to the direction of exhausted gas flow 20 in duct chamber 2.

The configuration of this battery block 51 is the same as that of battery block 1 of FIG. 1, except that positive electrode plate 52 has flow guide parts 53. Thus, hereinafter, each of flow guide part 53 is mainly described.

Flow guide parts 53 are provided correspondingly to 20 batteries, as shown in FIG. 6. As shown in FIG. 7, each of flow guide part 53 is an exhaust nozzle surrounded by ceiling 54 raised from positive electrode plate 52, and vertical walls 55, 56 connecting to positive electrode plate 52 on both sides of ceiling 54. As shown in FIG. 8, flow guide part 53 is provided to cover approximately a half area of fourth opening 43 provided in positive electrode current collector 14. Ceiling 54 of flow guide part 53 has a tilt angle with respect to positive electrode current corrector 14 as shown in FIG. 8 (b). The tilt angle is an acute angle, and is preferably approximately 30° to 45°.

Flow guide parts 53 having ceilings 54 with a tilt angel are provided to positive electrode plate 52 correspondingly to fourth openings 43 in this manner. Thus, as shown by the arrow outline with a blank inside in FIG. 8 (b), exhaust gas flow 57 jetting from fourth opening 43 is curved and guided so as to be close to exhaust gas flow direction 20 in duct chamber 2. This reduces the pressure loss in duct chamber 2; thus the exhaust gas jetting from safely valves 12 of batteries 4, 5 can be rapidly and smoothly released to the outside without staying inside.

When safety valves 12 are provided on the negative sides of batteries 4, 5, duct chamber 2 needs to be provided on the negative sides of batteries 4, 5. In this case, flow guide parts 53 are provided to negative electrode plate 18 correspondingly to fifth openings 48. Thus, the exhaust gas jetting from safely valves 12 on the negative electrode sides of batteries 4, 5 can be rapidly and smoothly released to the outside of duct chamber 2, without staying inside.

Figure 9:
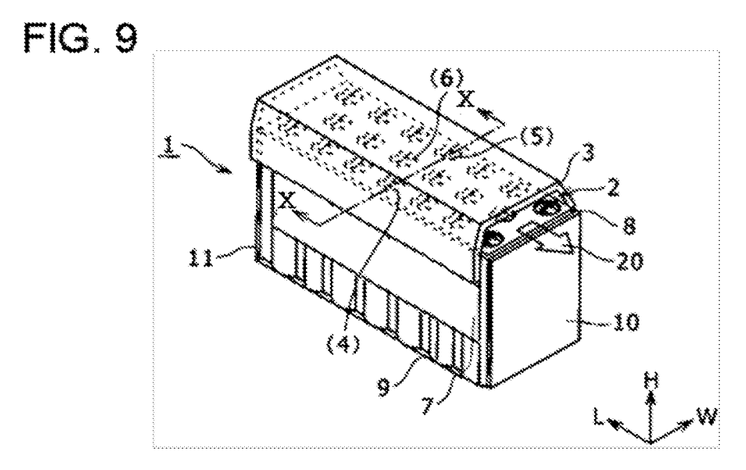
FIG. 9 is a perspective view of a battery block when a duct chamber is provided in accordance with a variation of the exemplary embodiment of the present invention.
Figure 10:
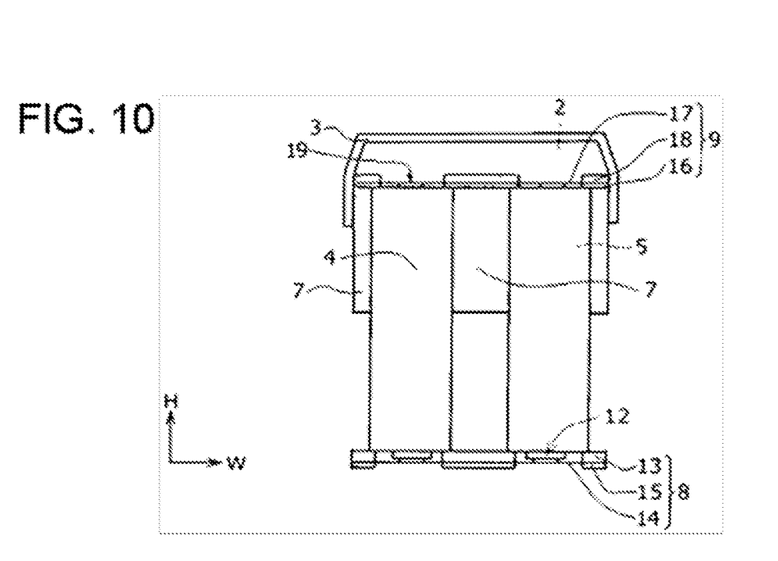
FIG. 10 is a sectional view taken along X-X line in FIG. 9.

FIG. 9 is a perspective view of a battery block when a duct chamber is provided in accordance with a variation of the exemplary embodiment of the present invention. FIG. 10 is a sectional view taken along X-X line in FIG. 9. In the variation of the exemplary embodiment, assuming batteries 4, 5 have a function of releasing the exhaust gas from the negative electrode sides, the part different from the exemplary embodiment is described.

In FIG. 9, one side is an upper side of the page along the H direction, which is toward duct chamber 2. The other side is the lower side of the page along the H direction and is a side opposite the side toward duct chamber 2.

In battery block 1, a plurality of batteries 4, 5 is arranged in a predetermined positional relation so that each of the negative electrode sides is on one side and each of the positive electrode sides is on the other side. The plurality of batteries is held in case 7, positive electrode-side current collecting part 8 is disposed on the positive electrode sides, and negative electrode-side current collecting part 9 is disposed on the negative electrode sides. Positive electrode-side current collecting part 8 and negative electrode-side current collecting part 9 are fastened via holders 10, 11 by a suitable fastening member.

When batteries 4, 5 are arranged in battery holding parts in case 7, the negative electrode sides of batteries 4, 5 are arranged on one side, and the positive electrode sides thereof are arranged on the other side.

Case 7 is a frame body that has a height smaller than that of each of batteries 4, 5, and has 20 battery holding parts with an opening at both ends in the height direction. Each of batteries 4, 5 is held in one battery holding part. Spaces are formed in part of the side faces of batteries 4, 5 not covered by case 7. Making the height of case 7 smaller than that of batteries 4, 5 can reduce the cost of the material of case 7. Through the spaces formed, natural air can be introduced to the side faces of batteries 4, 5 not covered by case 7. Case 7 may be disposed so that part of the height direction of batteries 4, 5 is in contact with the case. The case may be disposed equidistantly from the vicinity of the positive electrode side faces and the vicinity of the negative electrode side faces, or equidistantly from the positive electrode side faces and negative electrode side faces. Alternatively, case 7 may be disposed in the vicinity of the side faces of the negative electrode sides of batteries 4 5, so that case 7, negative electrode-side current collecting part 9 and positive electrode current collector 17 may be integrated without using negative electrode-side insulating plate 16. When case 7, negative electrode-side current collecting part 9, and negative electrode current collector 17 are integrated into one, case 7 can be used as a current collector, which can reduce the number of parts used in battery block 1.

The invention claimed is:

1. A battery block comprising:
   a plurality of batteries disposed in an arrangement, each of the plurality of batteries including a safety valve for releasing gas generated within the battery;
   a positive electrode-side current collecting part for collecting current by connecting positive electrode sides of the plurality of batteries;
   a negative electrode-side current collecting part for collecting current by connecting negative electrode sides of the plurality of batteries, and
   a plurality of fuses,
   wherein, in the positive electrode-side current collecting part and the negative electrode-side current collecting part that are connected to the plurality of batteries, one of the positive electrode-side current collecting part and the negative electrode-side current collecting part is connected to the safety valve of each of the plurality of batteries, and
   one of the plurality of fuses is connected between the other of the positive electrode-side current collecting part and the negative electrode-side current collecting part and each of the plurality of batteries, and
   wherein the gas released by the safety valve is released from the battery block without contacting the plurality of fuses.

2. The battery block of claim 1, wherein the one side current collecting part includes:
   a plurality of openings provided correspondingly to exhaust gas jet outlets of the safety valves of the batteries; and
   a plurality of flow guide parts, provided correspondingly to the openings, for guiding flow of exhaust gas jetting from the corresponding exhaust gas jet outlets to a predetermined exhaust gas direction.

3. The battery block of claim 1, wherein
   the one of the positive electrode-side current collecting part and the negative electrode-side current collecting part connected to the one of the plurality of fuses includes:
   a current collector plate body having electrical conductivity; and
   a plurality of electrode contact parts having a positional relation so that the electrode contact parts are in contact with the corresponding electrodes of the batteries, and
   the fuse is connected to each of the electrode contact parts at one end and connected to the current collector plate body at another end.

4. The battery block of claim 3, wherein each of the electrode contact parts, the fuse, and a current collector plate body connecting section provided at the another end of the fuse are formed on a flexible film.

* * * * *